(12) United States Patent
Pahn et al.

(10) Patent No.: US 12,003,186 B2
(45) Date of Patent: Jun. 4, 2024

(54) POWER MODULE FOR AN ELECTRIC DRIVE OF AN ELECTRIC VEHICLE OR A HYBRID VEHICLE, INVERTER COMPRISING SUCH A POWER MODULE

(71) Applicant: ZF Friedrichshafen AG, Friedrichshafen (DE)

(72) Inventors: Florian Pahn, Ravensburg (DE); Ivonne Trenz, Friedrichshafen (DE); Pengshuai Wang, Eriskirch (DE); Jonas Zeller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 255 days.

(21) Appl. No.: 17/702,585

(22) Filed: Mar. 23, 2022

(65) Prior Publication Data

US 2022/0311349 A1    Sep. 29, 2022

(30) Foreign Application Priority Data

Mar. 29, 2021  (DE) .......................... 102021203144.7

(51) Int. Cl.
*H02M 7/00*     (2006.01)
*H02G 5/02*     (2006.01)

(52) U.S. Cl.
CPC .............. *H02M 7/003* (2013.01); *H02G 5/02* (2013.01)

(58) Field of Classification Search
CPC ..... G06F 1/263; H02M 1/10; H02M 3/33561; H02M 7/003; H02M 3/088; H02M 3/1584; H02M 1/084; H02M 3/003; H02M 3/33523; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862;
(Continued)

(56) References Cited

U.S. PATENT DOCUMENTS 10,243,477 B2 *  3/2019  Morinaga ............... H01L 25/18
11,502,064 B2 * 11/2022  Reiter ..................... H10N 52/00
(Continued)

FOREIGN PATENT DOCUMENTS

DE    10 2006 050 291 A1    5/2007
DE    10 2006 008 632 A1    8/2007
(Continued)

OTHER PUBLICATIONS

Search Report in Corresponding German Application No. DE 10 2021 203 144.7, dated Feb. 28, 2022 (10 pages).

*Primary Examiner* — Jeffrey A Gblende
(74) *Attorney, Agent, or Firm* — Crowell & Moring LLP

(57) ABSTRACT

A power module includes a plurality of half-bridges, each including a substrate, a plurality of semiconductor switching elements, a positive DC power connection, a negative DC power connection, an AC power connection and a plurality of signal connections, wherein a respective DC busbar is connected to the respective DC power connection, wherein the two DC busbars extend from the half-bridges up to an intermediate circuit capacitor, wherein at least one of the two DC busbars is formed in one piece outside of the intermediate circuit capacitor with respect to the plurality of half-bridges.

20 Claims, 2 Drawing Sheets

(58) Field of Classification Search
CPC ........... H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 7/5395; H02M 7/483; H02M 1/0009; H01L 25/112; H01L 25/115; H01L 23/34; H01L 23/528; H01L 27/088; H01L 29/088; H01L 29/2003; H01L 23/49503; H01L 23/49562; H01L 23/49575; H01L 23/62; H01L 23/072; H01L 23/0248; H01L 29/1033; H01L 29/402; H01L 29/41758; H01R 13/6675; H01R 29/00; H01R 31/065; G09G 3/20; H02K 11/046; H01F 2027/406; H01F 27/30; H01F 41/0246; H05K 7/20927; H05K 2201/10166; H05K 2201/10507; H05K 7/2089

See application file for complete search history.

(56) References Cited

U.S. PATENT DOCUMENTS

| | | |
|---|---|---|
| 2019/0280510 A1 | 9/2019 | Sato |
| 2019/0280610 A1* | 9/2019 | Chung ................. H01L 25/072 |

FOREIGN PATENT DOCUMENTS

| | | |
|---|---|---|
| DE | 10 2015 113 515 A1 | 6/2016 |
| DE | 10 2015 012 915 A1 | 4/2017 |
| DE | 10 2019 220 010 A1 | 6/2021 |
| DE | 10 2020 205 420 A1 | 11/2021 |
| DE | 10 2020 206 199 A1 | 11/2021 |
| EP | 2099119 B1 | 11/2014 |

* cited by examiner

POWER MODULE FOR AN ELECTRIC DRIVE OF AN ELECTRIC VEHICLE OR A HYBRID VEHICLE, INVERTER COMPRISING SUCH A POWER MODULE

CROSS-REFERENCE TO RELATED APPLICATIONS

This application claims priority from German Application No. DE 102021203144.7, filed on Mar. 29, 2021, the entirety of which is hereby fully incorporated by reference herein.

FIELD

The invention relates to a power module for an inverter of an electric drive of an electric vehicle or a hybrid vehicle and to a corresponding inverter.

BACKGROUND AND SUMMARY

The prior art discloses pure electric vehicles and hybrid vehicles that are driven exclusively or in a manner supported by one or more electric machines as drive assemblies. In order to supply electrical energy to the electric machines of such electric vehicles or hybrid vehicles, the electric vehicles and hybrid vehicles comprise electrical energy stores, in particular rechargeable electric batteries. In this case, these batteries are formed as DC voltage sources; however, the electric machines usually require an AC voltage. Therefore, a power electronics system comprising what is known as an inverter is usually connected between a battery and an electric machine of an electric vehicle or a hybrid vehicle.

Inverters of this kind usually comprise semiconductor switching elements, which are typically formed from transistors. In this case, it is known to provide the semiconductor switching elements in different degrees of integration, specifically either as discrete individual switches with a low degree of integration but high scalability, as power modules with a high degree of integration but low scalability, and as half-bridges that range between individual switches and half-bridges with respect to degree of integration and scalability. Each half-bridge comprises a high-side switching position (subsequently: high side) having a higher electrical potential and a low-side switching position (subsequently: low side) having a lower electrical potential. The high side and the low side may each comprise one or a plurality of individual switches/semiconductor switching elements that are connected in parallel.

An intermediate circuit capacitor is provided connected in parallel with the semiconductor switching elements or the half-bridges. The intermediate circuit capacitor is used to smooth the DC-side input voltage in order to reduce voltage jumps.

Busbars are used for the purpose of contact-connecting the power connections from outside and DC power infeed as well as AC power withdrawal. A first busbar is used to contact-connect the positive DC power connection and is connected thereto. A second busbar is used to contact-connect the negative DC power connection and is connected thereto. An AC busbar is used to contact-connect the AC power connection and is connected thereto.

DE 10 2006 050 291 A1 discloses an electronic assembly that comprises a semiconductor circuit breaker and a semiconductor diode. Here, a bottom side of the semiconductor circuit breaker comprises an output contact mounted on a chip field of a carrier strip. In addition, a top side of the semiconductor circuit breaker comprises a control contact and an input contact. An anode contact of the semiconductor diode is arranged on the input contact of the semiconductor circuit breaker and electrically connected thereto. A cathode contact of the diode is electrically connected to the output contact of the power semiconductor switch.

DE 10 2006 008 632 A1 discloses a power semiconductor component part that comprises a leadframe, at least one vertical power semiconductor component and at least one further electronic component part. The vertical power semiconductor component has a first side and a second side. At least one first contact face and at least one control contact face are arranged on the first side. At least one second contact face is arranged on the second side. The at least one further electronic component part is arranged on the second contact face of the vertical power semiconductor component.

DE 10 2015 012 915 A1 discloses a semiconductor module comprising at least two semiconductor elements, which each have at least one first electrode on a first side and at least one second electrode on a second side. The first semiconductor element is arranged above the second semiconductor element. An electrically conductive connection is arranged between the first semiconductor element and the second semiconductor element. The at least one second electrode of the first semiconductor element is connected mechanically and electrically to the electrically conductive connection. The at least one first electrode of the second semiconductor element is connected mechanically and electrically to the electrically conductive connection.

DE 10 2019 220 010.9—the disclosure of which is intended to be incorporated in the present patent application—discloses a power module, in which the signal connections and the power connections are all arranged on a common side of the substrate and are surrounded by a potting compound. The power connections and the signal connections are all accessible from the common side of the substrate in such a way that the power connections and the signal connections extend through the potting compound as seen from the common side of the substrate and are arranged within a base area spanned by the substrate as seen from their passage direction through the potting compound.

DE 10 2020 205 420.7—the disclosure of which is intended to be incorporated in the present patent application—discloses a power module, in which the power connections and the signal connections are all formed in a leadframe. Ends of the power connections and of the signal connections extend laterally from the potting compound and each exhibit a right-angled bend perpendicular to a face along which the leadframe extends.

During operation of the inverter, high currents are sent through the semiconductor switching elements. These high currents generate a correspondingly large quantity of heat in the semiconductor switching elements or the half-bridges, and this must be dissipated in order to avoid overheating of the semiconductor switching elements and an associated impairment of the entire inverter. Therefore, a heat sink is provided, to which the semiconductor switching elements are thermally coupled.

It is necessary to remove heat not only from the semiconductor switching elements or the half-bridges but also the intermediate circuit capacitor that has DC current connections. In the known inverters, however, this leads to the intermediate circuit capacitor having a complex design and as a result it is also costly.

It is an object of the invention to provide a half-bridge for an electric drive of an electric or hybrid vehicle in which the disadvantages mentioned above are at least partly overcome.

This object is achieved in accordance with the invention by way of the power module and the inverter according to the present disclosure. Advantageous embodiments and refinements of the invention will emerge from the present disclosure, as well.

The invention relates to a power module for an electric drive of an electric vehicle or of a hybrid vehicle. The power module comprises a plurality of half-bridges, which each correspond to one of the current phases of the output-side multiphase alternating current. By way of example, the power module comprises three half-bridges, wherein each half-bridge is assigned to an associated current phase of the three-phase output current. The output current is an alternating current generated based on an input-side direct current by means of targeted switching processes of the semiconductor switching elements.

The half-bridges each comprise a substrate, a plurality of semiconductor switching elements, power connections and signal connections.

The substrate may be formed, for example, as a DBC (direct bonded copper) substrate, as a DPC (direct plated copper) substrate, as an AMB (active metal brazing) substrate or as an IM (insulated metal) substrate. The semiconductor switching elements, in particular transistors and diodes, are arranged on one side of the substrate and the associated power connections and signal connections are arranged on the other side. The substrate is preferably of rectangular form, in particular formed as a flat, disk-like rectangle, comprising in each case two opposite side edges. If necessary, the substrate can also be of square form.

The semiconductor switching elements form a high side and a low side in the half-bridge. The high side comprises one or more semiconductor switching elements connected in parallel with one another and enables the flow of current between the AC power connection and the positive DC power connection. The low side comprises one or more semiconductor switching elements connected in parallel with one another and enables the flow of current between the AC power connection and the negative DC power connection. The high side and the low side are connected in series with one another.

Provision is preferably made for the semiconductor switching elements to be designed as high-electron-mobility transistors (HEMTs), in particular gallium nitride (GaN) HEMTs. These types of semiconductor switching elements are comparatively well-suited to low-loss and rapid switching.

As an alternative, the semiconductor switching elements can be embodied as insulated-gate bipolar transistors and/or metal-oxide-semiconductor field-effect transistors. Insulated-gate bipolar transistors are in this case generally also known as IGBTs. Metal-oxide-semiconductor field-effect transistors are generally also known as MOSFETs.

Provision is particularly preferably made for a freewheeling diode to be assigned to each insulated-gate bipolar transistor. The freewheeling diodes protect the insulated-gate bipolar transistor assigned to them in each case from inductive overvoltages, in particular during switching of the transistors.

The power connections are for their part electrically connected to power contacts integrated into the semiconductor switching elements, for example source electrodes and drain electrodes, or to earth's mass, so that electrical power can be transmitted from one power connection through a semiconductor switching element to a further power connection. In this case, the electrical supply of the electric motor for driving the electric vehicle or the hybrid vehicle is ensured by means of the power connections.

The signal connections are used to electrically switch the semiconductor switching elements and are accordingly electrically connected to signal contacts of the semiconductor switching elements integrated into the semiconductor switching elements. Depending on the design of the semiconductor switching elements, the semiconductor switching element can then be switched so as to conduct current or to block current by way of energization or applying a voltage to the signal contact. In this way, the semiconductor switching elements are preferably switched according to pulse-width modulation (PWM) in order to make a sinusoidal time profile of the phase currents possible.

The semiconductor switching elements, the power connections and the signal connections of the respective half-bridge are preferably arranged on a first face of the substrate. The power connections and the signal connections can be contact-connected there in a simple manner by external components, in particular busbars. The first face is preferably one of the two comparatively largest faces of the layered substrate that are located opposite one another. The first face defines a main plane of the substrate.

The substrate has preferably been potted using a potting compound in an injection-molding method. The power connections and/or the signal connections preferably have external sections that extend from a second face orthogonal to the first face out of the potting compound toward outside. The second face is in this case a "side face" of the potted layered substrate, which is generally much smaller than the first face. The external sections preferably each have an end that extends perpendicularly to the first face. This enables simple electrical contact-connection of the power connections or the signal connections from outside of the half-bridge, in particular from above the power module.

A respective DC busbar, specifically a first DC busbar and a second DC busbar, which is connected to the respective DC power connection, is provided for external contact-connection of the positive DC power connection and the negative DC power connection. The connecting point is preferably located on the top side of the power module facing away from the substrate with respect to the semiconductor switching elements. The first DC busbar and second DC busbar preferably extend along a direction parallel to the main plane of the substrate, and specifically starting from the half-bridges or the DC power connections there up to an intermediate circuit capacitor.

The first and/or second DC busbar can be injection-molded with a current-isolating material in order to increase the air and creepage paths.

In accordance with the invention, at least one of the two DC busbars is formed in one piece outside of the intermediate circuit capacitor with respect to the plurality of half-bridges. This design is particularly advantageous compared to the power modules known from the prior art. In the power modules known from the prior art, each half-bridge has its own DC busbar for the positive and negative DC power connection. This means that, in the known power modules, the various positive and negative DC busbars of the various half-bridges are not formed in one piece outside of the intermediate circuit capacitor but are formed separately. Since the same positive/negative DC potential is to be applied to the positive/negative DC busbars irrespective of the half-bridge association, the positive/negative DC busbars are first electrically connected to one another in the intermediate circuit capacitor. This results in a complex design of the intermediate circuit capacitor with great expenditure in terms of manufacturing, which thus as a consequence is costly. Furthermore, the current density carried by the DC busbar is particularly high due to the separate design of the respective DC busbars with respect to the half-bridges, which leads to increased power losses and heat generation. In the power module according to the invention, the current density in the DC busbar or the two DC busbars in the region in which the DC busbar(s) is (are) formed in one piece with respect to the half-bridges is advantageously reduced. The generation of heat in the region of the intermediate circuit capacitor therefore decreases. It is no longer necessary to cool the intermediate circuit capacitor for the purpose of protection against overheating. This favors a simpler and more cost-effective design for the intermediate circuit capacitor.

The at least one DC busbar preferably has a common region with respect to the half-bridges that extends continuously along a sequence of the half-bridges. The common region extends continuously along a sequence of the half-bridges. The common region is preferably arranged between the half-bridges on one side and an intermediate circuit capacitor on the other side. The DC busbar has an associated end section for each half-bridge for connection to the positive and/or negative DC power connection of the respective half-bridges, in particular by way of welding. The various end sections associated with the half-bridges open in the common region in a direction facing away from the half-bridges, in particular a direction facing toward an intermediate circuit capacitor. The at least one DC busbar is thus formed in one piece and continuously with respect to the various half-bridges.

In this way, the area of the at least one DC busbar is increased in the horizontal direction, that is to say parallel to the main plane of the substrate. When the direct current that is fed in remains the same, this reduces the current density in the at least one DC busbar. As a result thereof, the heat in the intermediate circuit capacitor that arises on account of the direct current that is fed in is reduced. Using this measure, it is thus possible to avoid an active removal of heat in the intermediate circuit capacitor, for instance by connecting the housing of the intermediate circuit capacitor to a heat sink or applying a cooling medium to the housing. The intermediate circuit capacitor can therefore take on a simpler design and be produced in a cost-effective manner.

In accordance with one further embodiment, the two DC busbars each have a common region that extends continuously along a sequence of the half-bridges, wherein the two DC busbars are formed so as to overlap one another vertically in the respective common region. This measure increases the current density for both DC current lines, with the result that the heat generated in the intermediate circuit capacitor on account of the current infeed is reduced further.

In accordance with one further embodiment, a first DC busbar of the two DC busbars is electrically connected outside of the housing of the intermediate circuit capacitor to a first DC contact line of the intermediate circuit capacitor. The first DC contact line of the intermediate circuit capacitor is used as DC input contact with the same polarization as the first DC busbar. As a result of the fact that the first DC busbar is electrically connected to the first DC contact line outside of the housing of the intermediate circuit capacitor, tolerances with respect to the connecting points (in particular welding points) between the first DC busbar and the associated DC power connection can be better compensated.

In accordance with one further embodiment, the first DC contact line protrudes out of the housing of the intermediate circuit capacitor and is formed in a hook-like manner at one end in such a way that the first DC busbar is electrically connected horizontally to the first DC contact line at the end thereof. This measure facilitates the current-conducting connection between the first DC busbar and the first DC contact line. At the same time, this measure favors a flat and overall space-saving design of the inverter.

In accordance with one further embodiment, a second DC busbar of the two DC busbars extends into the housing of the intermediate circuit capacitor and there transitions into a second DC contact line of the intermediate circuit capacitor. In this way, the second DC busbar and the second DC contact line are formed in one part, with the result that the second DC contact line is present as an extension of the first DC busbar. This measure increases the manufacturing simplicity of the power module or of the inverter.

In accordance with one further embodiment, a current-isolating thin-layer film is arranged between the two DC busbars. This measure ensures DC isolation between the two DC busbars, which is very important in high-voltage applications for the functionality of the inverter. Furthermore, the air and creepage paths between the two DC busbars are increased given the same reduced spacing between the two DC busbars.

The invention furthermore relates to an inverter for an electric drive of an electric vehicle or a hybrid vehicle comprising a power module of this kind. This results in the advantages that have already been described in connection with the half-bridge according to the invention for the power module according to the invention and the inverter according to the invention as well.

The invention will be discussed by way of example below on the basis of embodiments illustrated in the figures.

Identical objects, functional units and similar components are denoted by the same reference designations throughout the figures. These objects, functional units and similar components are of identical design in terms of their technical features unless explicitly or implicitly stated otherwise in the description.

DETAILED DESCRIPTION

Figure 1:
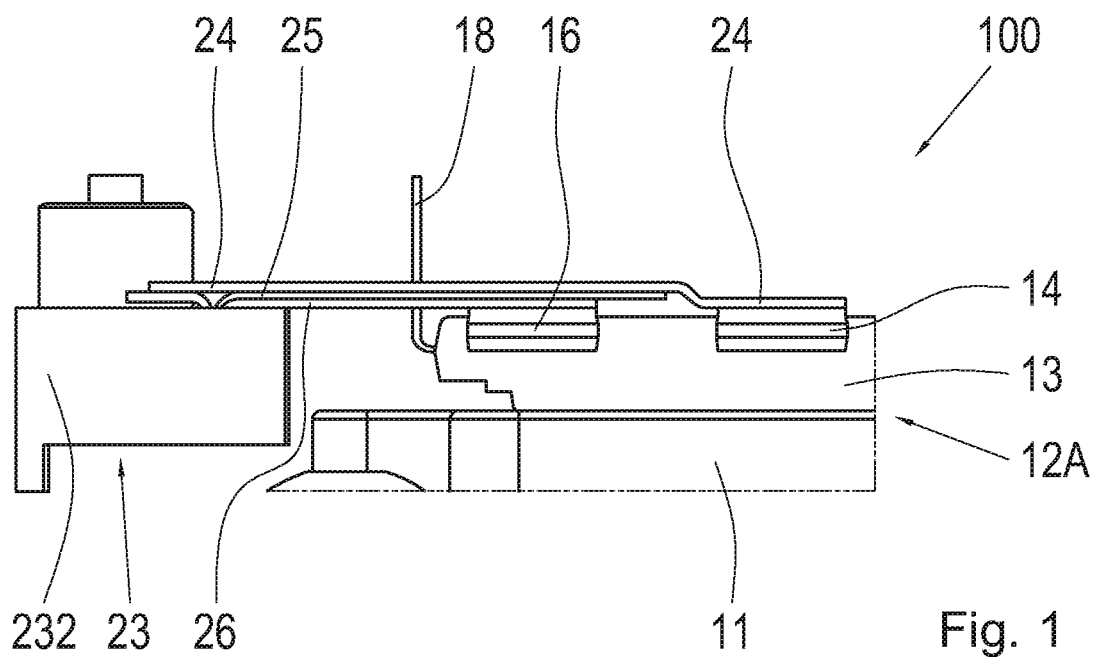
FIG. 1 shows a schematic side view of an inverter comprising a power module in accordance with one embodiment.
Figure 2:
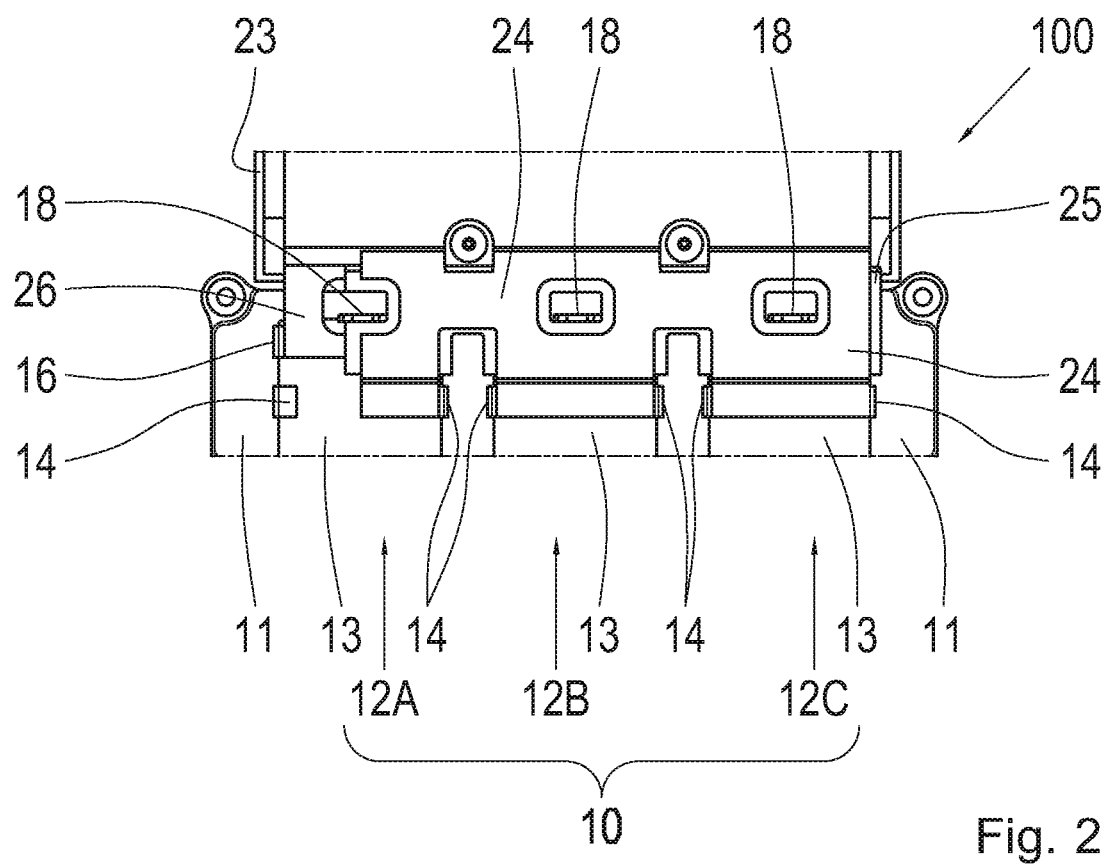
FIG. 2 shows a schematic plan view of the inverter from FIG. 1.
Figure 3:
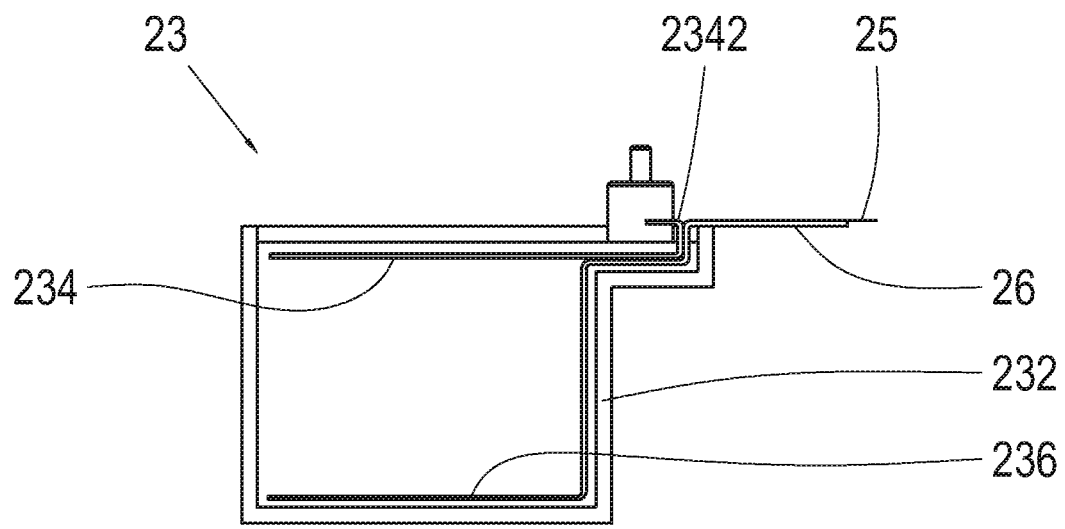
FIG. 3 shows a schematic sectional view of an intermediate circuit capacitor of the inverter from FIG. 1.
Figure 4:
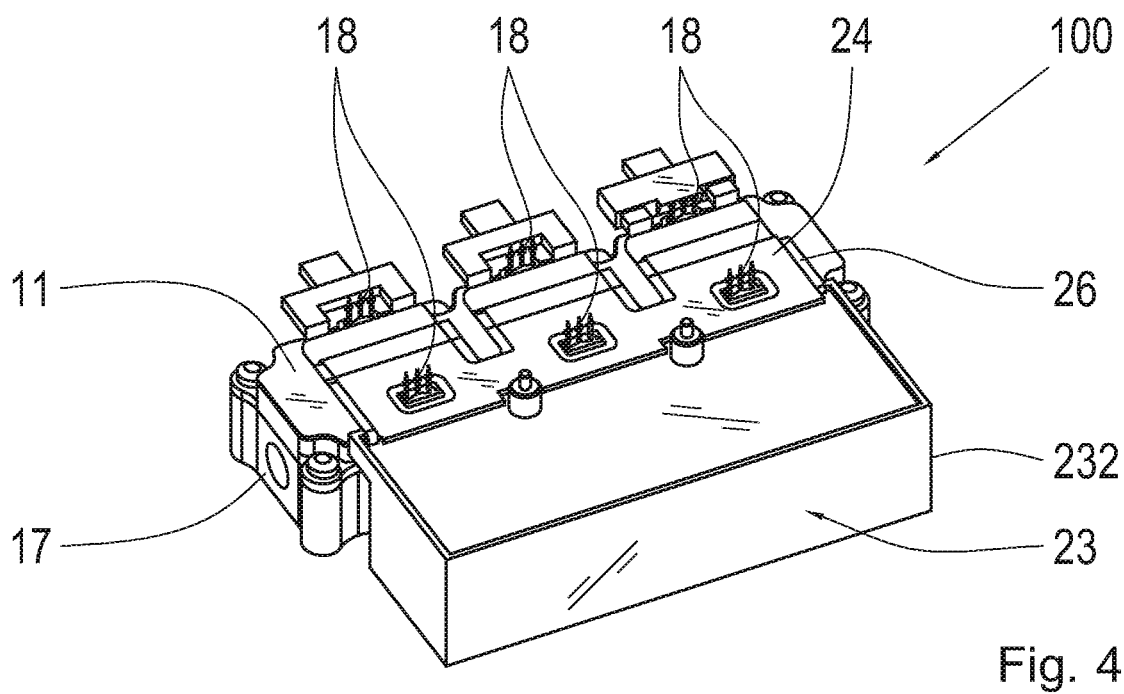
FIG. 4 shows a schematic perspective view of the inverter from FIG. 1.

FIGS. 1-4 show an inverter 100 in accordance with one embodiment. FIG. 1 shows the inverter 100 in a schematic side view. FIG. 2 shows the inverter 100 in a schematic plan view. FIG. 3 shows an intermediate circuit capacitor 23 of the inverter 100 in a schematic sectional view. FIG. 4 shows the inverter 100 in a schematic perspective view.

The inverter 100 comprises a power module 10 (see FIG. 2), which comprises a plurality of (in this case by way of example three) half-bridges 12A, 12B, 12C. Each half-bridge 12A, 12B, 12C comprises a substrate (not shown), on which a plurality of semiconductor switching elements (not shown) are mounted. The substrate may be formed as a direct bonded copper substrate, which comprises two metal layers and an insulating layer arranged between them. The semiconductor switching elements, for instance IGBTs or MOSFETs, are mounted on one of the metal layers. The other metal layer is connected to a heat sink 11 in order to dissipate heat that is generated during operation of the inverter 100 on account of current being fed into the semiconductor switching elements. The heat sink 11 is mounted on an inverter housing 17.

As illustrated in FIGS. 1, 2 and 4, the substrate and the semiconductor switching elements of the respective half-bridges 12A, 12B, 12C are potted using a potting compound 13 in order to ensure protection against external influences. Each half-bridge 12A, 12B, 12C also comprises a plurality of DC power connections 14, 16, at least one AC power connection and a plurality of signal connections 18. A positive DC power connection 14 and a negative DC power connection 16 are used to feed in a DC input current that is generated by a DC current source, for instance a lithium-ion battery or a fuel cell. The AC power connection is used to output an AC output current, which is generated based on the DC input current by means of targeted switching processes of the semiconductor switching elements, to an electric drive of a purely electric or hybrid vehicle, in particular in order to energize the electric motor located there. The signal connections 18 are used to send control signals generated by a drive electronic system for switching the semiconductor switching elements to said semiconductor switching elements.

The inverter 100 also comprises a first DC busbar 24 and a second DC busbar 26. The first DC busbar 24 is electrically connected to the positive power connections 14 of the half-bridges 12A, 12B, 12C. The second DC busbar 26 is electrically connected to the negative power connections 16 of the half-bridges 12A, 12B, 12C. Furthermore, the first DC busbar 24 and the second DC busbar 26 are connected to the direct current source (not shown) via the intermediate circuit capacitor 23. In this way, the half-bridges 12A, 12B, 12C can be supplied with direct currents from the current source.

The first DC busbar 24 and the second DC busbar 26 each extend from the associated DC power connections 14, 16 up to the intermediate circuit capacitor 23. The two DC busbars 24, 26 are each formed in one piece outside of the intermediate circuit capacitor 23. The two DC busbars 24, 26 preferably each have a common region with respect to the half-bridges 12A, 12B, 12C that extends continuously along the sequence of the half-bridges 12A, 12B, 12C (that is to say in the direction toward the plane of the drawing in FIG. 1 or in the direction from left to right in FIG. 2). This measure increases the area of the DC busbars 24, 26, which brings about a reduction in the current density in the DC busbars 24, 26. The heat that is generated in the vicinity of the intermediate circuit capacitor 23 thus decreases as a result. The intermediate circuit capacitor 23 can be manufactured without active cooling and thus in a more cost-effective manner. The DC busbars 24, 26 can also be manufactured to be thinner than previously, which leads to a more compact design of the power module 10 and of the inverter 100 as a whole.

As shown schematically in FIGS. 1 and 3, the first DC busbar 24 is connected to an end section 2342 of a first DC contact line 234, in particular is welded to the end section 2342, on the side of the intermediate circuit capacitor 23. The end section 2342 of the first DC contact line 234 of the intermediate circuit capacitor 23 is formed in a hook-like manner so that the welding point is arranged above the end section 2342. This manner of connection permits a flat design of the inverter 100 and is particularly simple to implement. A second DC contact line 236, which is formed as an extension of the second DC busbar 26, is likewise provided in the intermediate circuit capacitor 23.

As shown in FIGS. 1-3, a current-isolating thin-layer film 25 is arranged between the first DC busbar 24 and the second DC busbar 26. This measure ensures DC isolation between the two DC busbars 24, 26, wherein a flat design of the power module 10 is produced while retaining the creepage path between said busbars.

REFERENCE DESIGNATIONS

100 Inverter
10 Power module
11 Heat sink
12A-C Half-bridges
13 Potting compound
14 Positive DC power connection
16 Negative DC power connection
17 Inverter housing
18 Signal connections
23 Intermediate circuit capacitor
232 Housing
234 First DC contact line
2342 End section/end
236 Second DC contact line
24 First DC busbar
25 Current-isolating thin-layer film
26 Second DC busbar

The invention claimed is:

1. A power module for an inverter for operating an electric drive in an electric vehicle or a hybrid vehicle, the power module comprising:
   a plurality of half-bridges, wherein each one of the plurality of half-bridges each comprises a substrate, a plurality of semiconductor switching elements, a positive DC power connection, a negative DC power connection, an AC power connection, and a plurality of signal connections,
   wherein the plurality of signal connections are electrically connected to the semiconductor switching elements in each half-bridge such that the semiconductor switching elements are configured to be switched by the signal connections, wherein the power connections are electrically connected to the semiconductor switching elements such that the semiconductor switching elements are configured to permit or interrupt an electrical power transmission between the power connections; and
   a positive busbar connected to the positive DC power connection and configured to provide external contact-connection for the positive DC power connection; and
   a negative busbar connected to the negative DC power connection and configured to provide external contact-connection for the negative DC power connection,
   wherein the positive DC busbar and the negative DC busbar each extend from the plurality of half-bridges up to an intermediate circuit capacitor, and
   wherein at least one of the positive DC busbar or the negative DC busbar is formed in one piece outside of the intermediate circuit capacitor with respect to the plurality of half-bridges.

2. The power module according to claim 1, wherein the at least one of the positive DC busbar or the negative DC busbar comprises a common region with respect to the plurality of half-bridges that extends continuously along a sequence of the plurality of half-bridges.

3. The power module according to claim 2, wherein the common region is arranged between the half-bridges on one side of the common region and the intermediate circuit capacitor on another side of the common region.

4. The power module according to claim 1,
wherein the positive DC busbar and the negative DC busbar each have a common region that extends continuously along a sequence of the plurality of half-bridges, and
wherein the positive DC busbar and the negative DC busbar are formed so as to overlap one another vertically in the respective common regions.

5. The power module according to claim 3, wherein the at least one of the positive DC busbar or the negative DC busbar is connected to the intermediate circuit capacitor, wherein the intermediate circuit capacitor comprises a housing.

6. The power module according to claim 5, wherein a first DC busbar of the positive DC busbar and the negative DC busbar is electrically connected outside of the housing of the intermediate circuit capacitor to a first DC contact line of the intermediate circuit capacitor.

7. The power module according to claim 6, wherein the first DC contact line protrudes out of the housing of the intermediate circuit capacitor and is formed in a hook-like manner at one end in such a way that the first DC busbar is electrically connected horizontally to the first DC contact line at the end thereof.

8. The power module according to claim 5, wherein a second DC busbar of the positive DC busbar and the negative DC busbar extends into the housing of the intermediate circuit capacitor and there transitions into a second DC contact line of the intermediate circuit capacitor.

9. The power module according to claim 1, further comprising:
a current-isolating thin-layer film arranged between the positive DC busbar and the negative DC busbar.

10. An inverter for an electric drive of an electric vehicle or a hybrid vehicle, comprising the power module of claim 1.

11. The power module according to claim 2,
wherein the positive DC busbar and the negative DC busbar each have a common region that extends continuously along a sequence of the plurality of half-bridges, and
wherein the positive DC busbar and the negative DC busbar are formed so as to overlap one another vertically in the respective common regions.

12. The power module according to claim 3,
wherein the positive DC busbar and the negative DC busbar each have a common region that extends continuously along a sequence of the plurality of half-bridges, and
wherein the positive DC busbar and the negative DC busbar are formed so as to overlap one another vertically in the respective common regions.

13. The power module according to claim 4, wherein the at least one of the positive DC busbar or the negative DC busbar is connected to the intermediate circuit capacitor, wherein the intermediate circuit capacitor comprises a housing.

14. The power module according to claim 6, wherein a second DC busbar of the positive DC busbar and the negative DC busbar extends into the housing of the intermediate circuit capacitor and there transitions into a second DC contact line of the intermediate circuit capacitor.

15. The power module according to claim 7, wherein a second DC busbar of the positive DC busbar and the negative DC busbar extends into the housing of the intermediate circuit capacitor and there transitions into a second DC contact line of the intermediate circuit capacitor.

16. The power module according to claim 2, further comprising:
a current-isolating thin-layer film arranged between the positive DC busbar and the negative DC busbar.

17. The power module according to claim 3, further comprising:
a current-isolating thin-layer film arranged between the positive DC busbar and the negative DC busbar.

18. The power module according to claim 4, further comprising:
a current-isolating thin-layer film arranged between the positive DC busbar and the negative DC busbar.

19. The power module according to claim 5, further comprising:
a current-isolating thin-layer film arranged between the positive DC busbar and the negative DC busbar.

20. The power module according to claim 6, further comprising:
a current-isolating thin-layer film arranged between the positive DC busbar and the negative DC busbar.

* * * * *